(12) United States Patent
Sessa et al.

(10) Patent No.: US 10,472,875 B2
(45) Date of Patent: Nov. 12, 2019

(54) ELECTRIC ACTUATOR FOR AN ENTRY AND EXIT DEVICE

(71) Applicant: ISAF BUS COMPONENTS S.R.L., Mornago, Varese (IT)

(72) Inventors: Massimo Sessa, Varese (IT); Gianni Turcati, Varese (IT)

(73) Assignee: ISAF BUS COMPONENTS S.R.L., Varese (IT)

( * ) Notice: Subject to any disclaimer, the term of this patent is extended or adjusted under 35 U.S.C. 154(b) by 614 days.

(21) Appl. No.: 14/891,700

(22) PCT Filed: Apr. 18, 2014

(86) PCT No.: PCT/IB2014/060832
§ 371 (c)(1),
(2) Date: Nov. 17, 2015

(87) PCT Pub. No.: WO2014/184691
PCT Pub. Date: Nov. 20, 2014

(65) Prior Publication Data
US 2016/0115724 A1 Apr. 28, 2016

(30) Foreign Application Priority Data
May 17, 2013 (EP) ..................................... 13425076

(51) Int. Cl.
*E05F 15/603* (2015.01)
*E05F 15/40* (2015.01)
(Continued)

(52) U.S. Cl.
CPC .............. *E05F 15/603* (2015.01); *B60J 5/00* (2013.01); *E05F 15/40* (2015.01); *E05F 15/53* (2015.01);
(Continued)

(58) Field of Classification Search
CPC ...... E05F 15/603; E05F 15/611; E05F 15/614; E05F 5/022; B60J 5/00; H02K 7/116
See application file for complete search history.

(56) References Cited

U.S. PATENT DOCUMENTS 3,843,097 A * 10/1974 Noly .................. B66D 1/26
254/297
2002/0026750 A1 * 3/2002 St. John .............. E05F 15/603
49/332

(Continued)

FOREIGN PATENT DOCUMENTS

| DE | 202008011200 U1 | 12/2009 |
| EP | 0217228 A2 | 4/1987 |

OTHER PUBLICATIONS

International Search Report for PCT/162014/060832 dated Sep. 9, 2014.
European Search Report for EP 13425076 dated Aug. 30, 2013.
Translation of DE 202008011200 published on Dec. 31, 2009.
Translation of EP 0217228 published on Apr. 8, 1987.

*Primary Examiner* — Gregory J Strimbu

(57) ABSTRACT

A rotary actuator (1) for a door (2) or ramp comprises an electric motor (3), a reduction gear (4, 5) connected to a front portion (6) of a shaft (7) of the motor (3), an output shaft (8) connected to the reduction gear (4, 5), an automatic locking brake (9) connected to a rear portion (10) of the motor shaft (7) and a decoupler (11) connected between the rear portion (10) of the motor shaft (7) and the locking brake (9) and actuatable to decouple the motor shaft (7) from the locking brake (9).

19 Claims, 3 Drawing Sheets

Figures 1, 2:
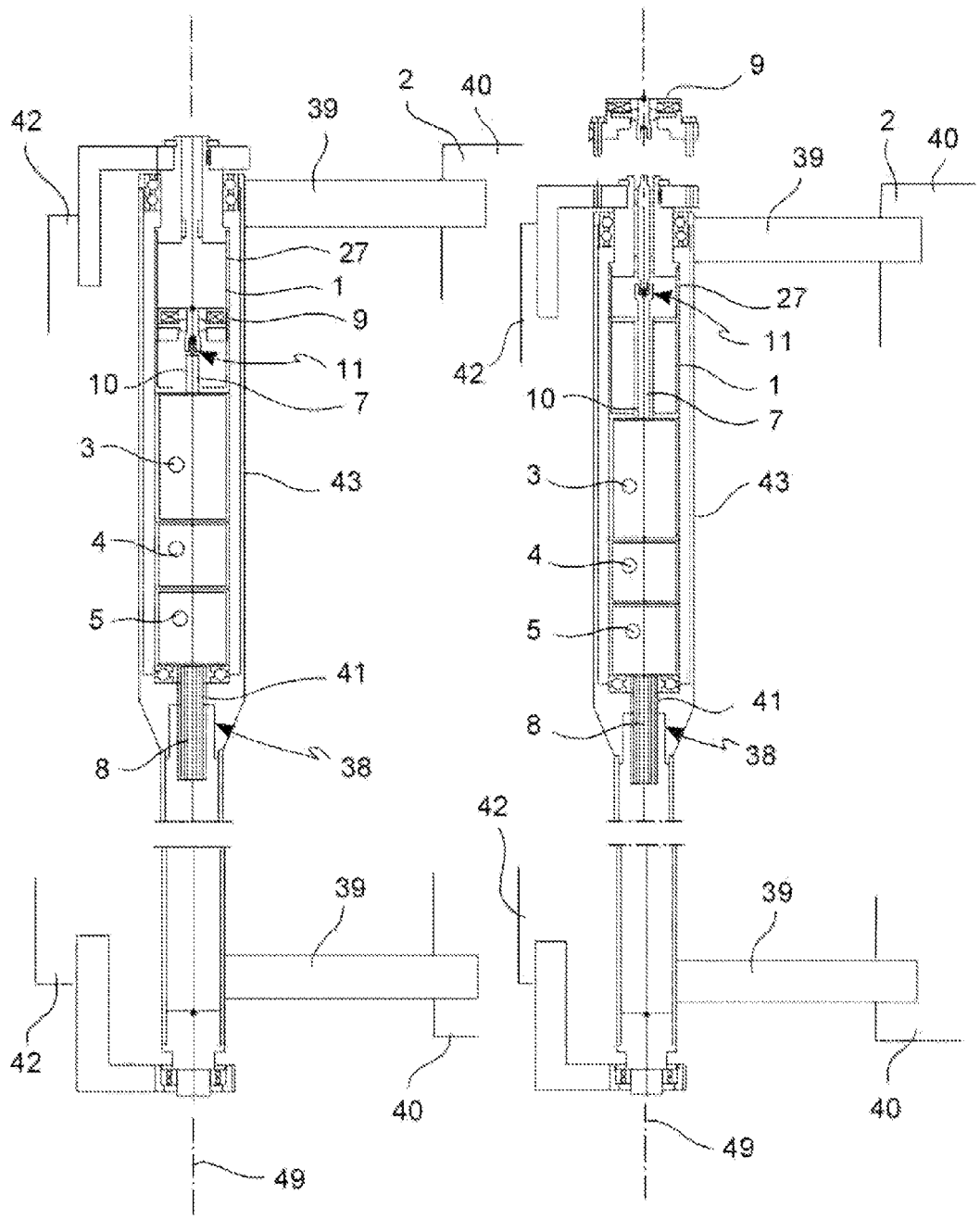

(51) Int. Cl.
  *E05F 15/53* (2015.01)
  *E05F 15/614* (2015.01)
  *E05F 15/70* (2015.01)
  *B60J 5/00* (2006.01)
  *H02K 7/112* (2006.01)
  *H02K 7/116* (2006.01)
  *E05D 15/30* (2006.01)
  *E05F 15/63* (2015.01)

(52) U.S. Cl.
  CPC ............ *E05F 15/614* (2015.01); *E05F 15/70* (2015.01); *H02K 7/116* (2013.01); *H02K 7/1125* (2013.01); *E05D 15/30* (2013.01); *E05F 15/63* (2015.01); *E05Y 2201/214* (2013.01); *E05Y 2800/116* (2013.01); *E05Y 2900/506* (2013.01); *E05Y 2900/51* (2013.01)

(56) References Cited

U.S. PATENT DOCUMENTS

| | | | | |
|---|---|---|---|---|
| 2009/0255358 | A1* | 10/2009 | Muller | B61D 19/023 |
| | | | | 74/405 |
| 2010/0287842 | A1* | 11/2010 | Harding | E05F 15/614 |
| | | | | 49/358 |
| 2010/0295542 | A1* | 11/2010 | Pellegrini | E05F 15/603 |
| | | | | 324/207.25 |
| 2011/0174093 | A1* | 7/2011 | Pellegrini | E05F 15/41 |
| | | | | 74/25 |
| 2015/0330134 | A1* | 11/2015 | Bendel | E05D 11/087 |
| | | | | 701/49 |

\* cited by examiner

ELECTRIC ACTUATOR FOR AN ENTRY AND EXIT DEVICE

CROSS-REFERENCE TO RELATED APPLICATION

This application is the 35 U.S.C. § 371 national stage application of PCT Application No. PCT/IB2014/060832, filed Apr. 18, 2014, which claims priority to and the benefit of, EP Patent Application No. 13425076.0, filed May 17, 2013, both of which are herein incorporated by reference in their entirety.

The present invention relates to a rotary actuator for moving a door with an orientable or roto-translatable shutter, in particular for public transport means, e.g., buses and trains.

The orientable shutter of a vehicle door, for example, of a bus, is connected by orientable arms, or directly, to a rotating column, and it is displaceable, through a rotatory movement of the rotating column, from an opening position to a closure position.

In a first known configuration, the movement of the rotating column occurs through a rotary actuator with an outer housing constrained to the vehicle structure and an output shaft supported in the outer housing and connected to the rotating column integrally in rotation. Therefore, the movement of the shutter occurs in response to a rotation of the output shaft, while the housing is stationary. In this first configuration, the use is known, of a rotary actuator with a pneumatic linear actuator and a screw transmission converting the linear movement of the linear actuator into a rotatory movement of the output shaft.

In a second known configuration, the movement of the rotating column occurs through a rotary actuator with an outer housing that forms itself the rotating column or that is constrained integrally in rotation with the rotating column, as well as with a stationary shaft supported in the outer housing and constrained to the structure of the vehicle. Unlike the first configuration, the movement of the shutter here occurs in response to a rotation of the outer housing, while the shaft is stationary.

In this second configuration, the use is preferred of a compact electric rotary actuator, since the known fluid-dynamic actuators have diameters that are too large to act themselves as a rotating column.

The known electric rotary actuators are provided with an automatic locking brake that is permanently elastically pushed in a locking position to maintain the closure of the door when the electric actuator is turned off, and electrically releasable during the operation of the rotary actuator.

Furthermore, the electric rotary actuators have to be provided with a mechanical emergency opening device that, in the case of electric power interruption, allows opening the door in spite of the impossibility to release the locking brake.

As an emergency opening device, it is known to provide a mechanical decoupler between two reduction stages of the rotary actuator, which allows uncoupling the motion, for example, by manual actuation of a Bowden cable.

Rotary actuators have to develop high closure torques, indicatively ranging between 120 Nm . . . 250 Nm, to oppose violent impacts due to acts of vandalism, in addition to the fluid-dynamic depression tending to open the doors, especially on extra-urban transport means traveling at high speeds However, the high closure torque considerably increases the friction between the components of the decoupler, the manual actuation of which may therefore require a force that is too high for children, the elderly, or women.

Further drawbacks of the known rotary actuators are:
the radial and axial overall dimensions, which prevent the integration thereof in the rotating column,
the difficult access to the automatic locking brake ("negative brake") and to other components of the actuator during control, maintenance and repair interventions,
the wear of the Bowden cables and the electric connections due to the rotation of the actuator and the relative cyclic movements of the connection area of the Bowden cable and the electric cables to the rotary actuator,
the breaking risk of the reduction gears due to their reduced dimensions necessary for the positioning in the rotating column, and the high torques.

Therefore, the object of the present invention is to provide a rotary electric actuator for moving an orientable or roto-translatable door, in particular for public transport vehicles, having such characteristics as to at least partially obviate the drawbacks of the prior art.

These and other objects are achieved by a rotary actuator for an entry/exit device, in particular an orientable and/or translatable door or ramp and the like in public transport vehicles, comprising an electric motor, a reduction gear arranged on a front side of the motor and connected to a front portion of a shaft of the motor, an output shaft connected to the reduction gear, an automatic locking brake arranged on a rear side of the motor opposite the front side and connected to a rear portion of the motor shaft, as well as a decoupler connected between the rear portion of the motor shaft and the locking brake, and actuatable to decouple the motor shaft from the locking brake.

By virtue to the arrangement in series (and if possible, but not necessarily, co-axial) in the sequence: locking brake-decoupler-electric motor-reduction gear-output shaft, compared to the prior art the torque creating the friction between the decoupler components is reduced in the order of the reduction ratio of at least one first reduction stage, about 1:25, and consequently the manual uncoupling force (Bowden force) is considerably reduced and easily applicable also by the elderly, children, and women. In fact, the transmission ratio, from the motor to the door rotating column is about 600 . . . 700:1, consequently the torque of the motor (and the locking torque of the brake) is about 600 . . . 700 times less than the closure torque of the door. From the viewpoint of facilitating a manual opening, according to the inventors, the ideal point for an easy (start of) uncoupling is to decouple the locking brake from the motor.

However, there is still the drawback that for a "manual push" opening of the door, it is necessary to overcome the resistance due to the inertia of the reducers and the motor.

For this reason, in accordance with a further aspect of the invention, it is provided that the actuator comprises a second decoupler connected between the reduction gear and the output shaft and actuatable to decouple the output shaft from the second reduction gear, in which the second decoupler can be actuated following the actuation of the first decoupler.

In this manner, in the case of electric power interruption for opening the door 2 by means of the actuator 1, the output shaft 8 can be manually uncoupled from the entire motor 3—first reduction gear 4—second reduction gear 5 unit, for further promoting the opening of the door 2 by a simple manual push.

Figure 3:
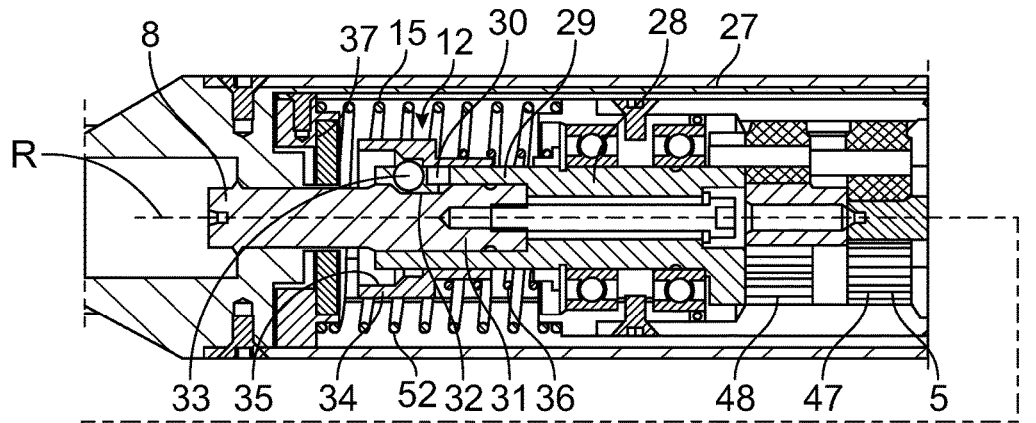
Figure 4:
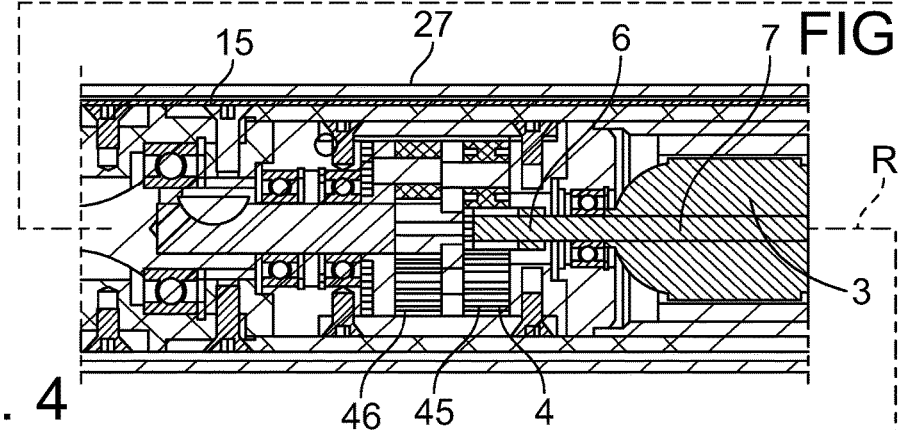
Figure 5:
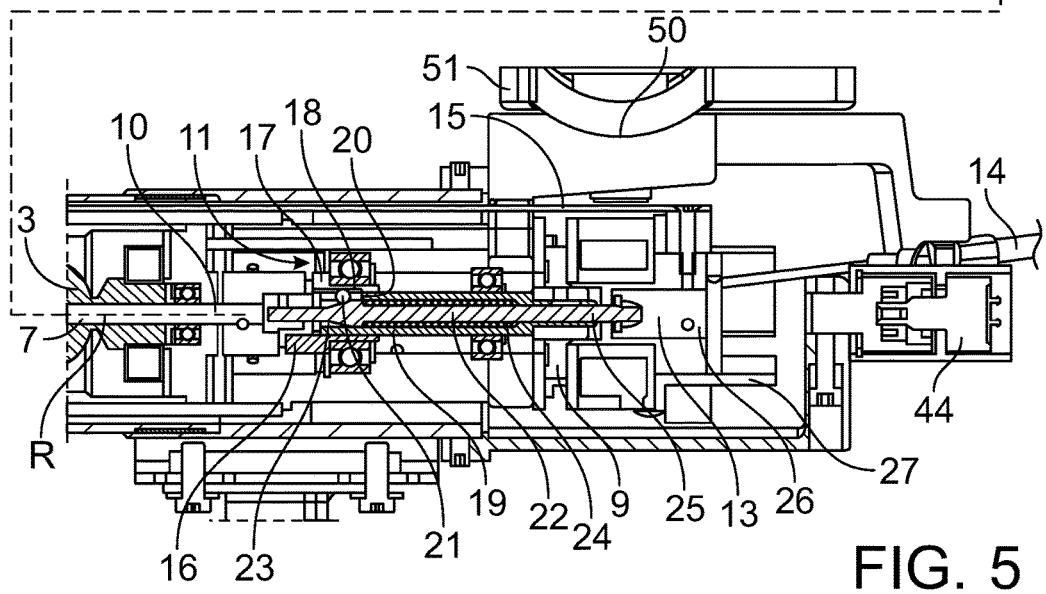
Figure 6:
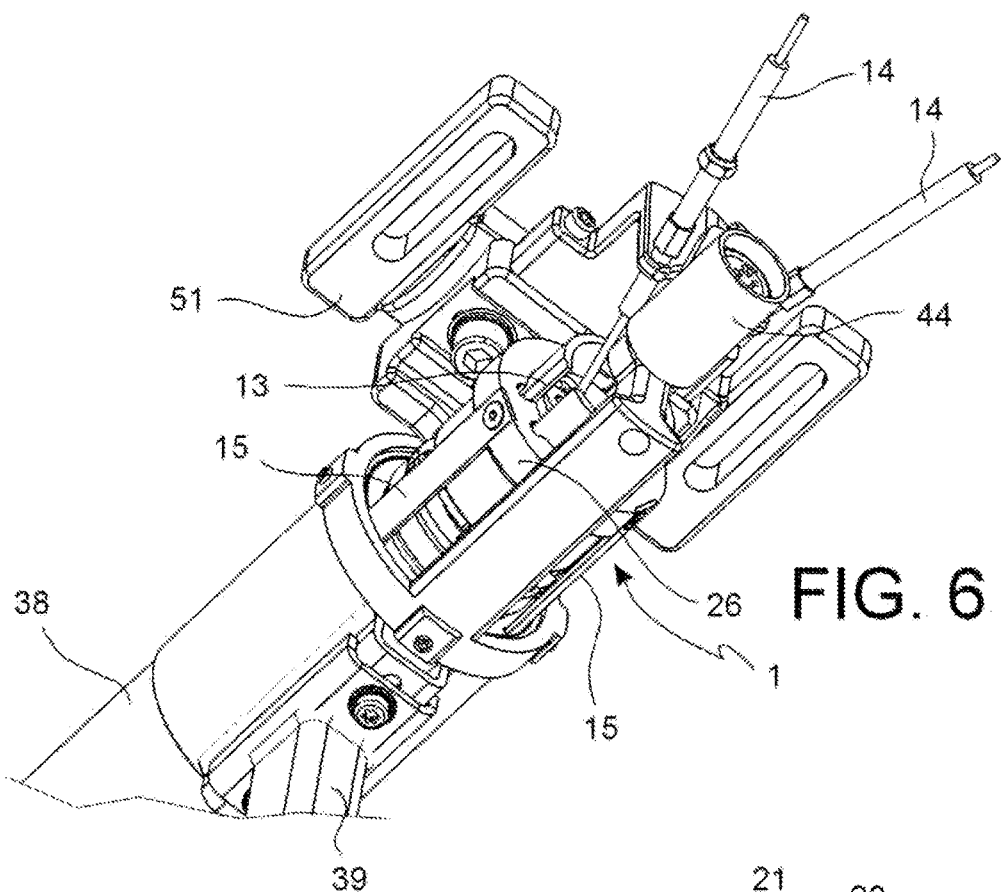
Figures 7, 8:
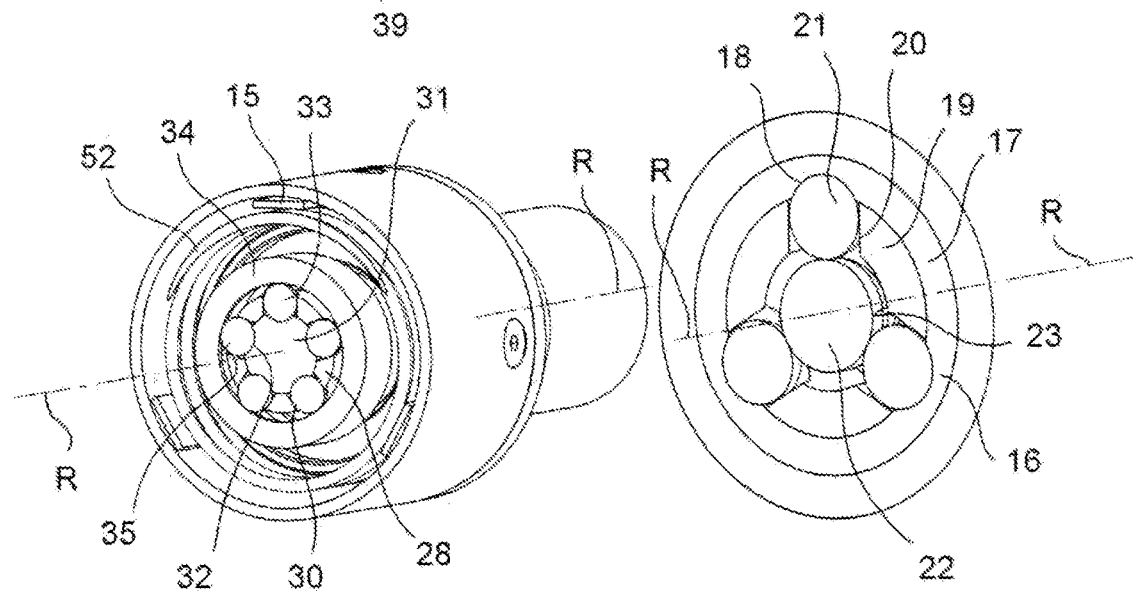

In order to better understand the invention and appreciate the advantages thereof, some exemplary, non-limiting embodiments thereof will be described herein below, with reference to the drawings, in which:

FIG. 1 is a schematized view of a rotary actuator according to an embodiment,

FIG. 2 is a schematized view of a rotary actuator according to a further embodiment, FIGS. 3, 4 and 5 are longitudinal sectional views of details of the rotary actuator according to various embodiments, FIG. 6 is a perspective view of a detail of the actuator according to various embodiments, FIGS. 7 and 8 illustrate details of mechanical decouplers of the rotary actuator according to various embodiments.

With reference to the Figures, a rotary actuator 1 for an entry/exit device, in particular an orientable and/or translatable door or ramp 2 and the like in public transport vehicles, comprises an electric motor 3, a first reduction gear 4 arranged on a front side of the motor 3 and connected to a front portion 6 of a shaft 7 of the motor 3, a second reduction gear 5 connected to the first reduction gear 4, an output shaft 8 connected to the second reduction gear 5, an automatic locking brake 9 arranged on a rear side of the motor 3 opposite the front side and connected to a rear portion 10 of the motor shaft 7, as well as a decoupler 11 connected between the rear portion 10 of the motor shaft 7 and the locking brake 9 and actuatable to decouple the motor shaft 7 from the locking brake 9.

By virtue to the arrangement in series in the sequence: locking brake 9—decoupler 11—electric motor 3—first reduction gear 4—second reduction gear 5—output shaft 8, compared to the prior art, the torque creating the friction between the decoupler 11 components is reduced in the order of the reduction ratio of the first reduction gear 4, i.e., about 1:25 (or, in other words, the torque transmitted by the decoupler is 600 . . . 700 times less than the closure torque of the door) and consequently the manual uncoupling force (Bowden force) is considerably reduced and easily applicable also by the elderly, children and women.

In accordance with an embodiment, the actuator 1 comprises a second decoupler 12 connected between the second reduction gear 5 and the output shaft 8 and actuatable to decouple the output shaft 8 from the second reduction gear 5.

In this manner, in the case of electric power interruption for opening the door 2 by means of the actuator 1, the output shaft 8 can be manually uncoupled from the entire motor 3—first reduction gear 4—second reduction gear 5 unit, for further promoting the opening of the door 2 by a simple manual push.

Advantageously, the rotary actuator 1 comprises an unlocking mechanism 13 actuatable manually and configured so as to first actuate the first decoupler 11 and then the second decoupler 12.

Similarly, the invention contemplates a method for uncoupling the output shaft 8 from the locking brake 9, comprising the steps of:
  connecting a first decoupler 11 between the locking brake 9 and the motor 3 and a second decoupler 12 between the reduction gear 4, 5 and the output shaft 8,
  actuating the first decoupler 11 to decouple the motor 3 from the locking brake 9 and, subsequently, actuating the second decoupler 12 to decouple the output shaft 8 from the second reduction gear 5.

In this manner, the friction between the components of the first decoupler 11 and the manual uncoupling force (Bowden force) of the first decoupler 11 are considerably reduced, since the first decoupler is connected directly to the motor shaft, and, after uncoupling the motor 3 from the locking brake 9, eliminating the reaction torque of the brake, also the friction between the components of the second decoupler 12 and the manual uncoupling force (Bowden force) of the second decoupler 12 are reduced, facilitating both the manual uncoupling operation, and the manual opening of the door 2.

In accordance with an embodiment, the unlocking mechanism 13 comprises a Bowden cable 14 connected to the first decoupler 11 and to at least one tie-rod 15, in turn connected to the second decoupler 12.

As illustrated in the FIGS. 3 and 5, the first decoupler 11 comprises a first shaft 16 (connected to the motor shaft 7) having a tubular wall 17 forming an inner cavity and one or more (preferably three) locking cavities 18, a second tubular shaft 19 (connected to the locking brake 9) and received into the inner cavity of the tubular wall 17 rotatably about a rotational axis R and forming one or more through openings 20 in a position suitable to overlap with the locking cavities 18.

One or more locking members 21 are received in the through openings 20 of the second shaft 19, for example rolling members, rollers, spheres, etc., displaceable between a radially outer position in engagement with the through opening 20 and with the locking cavity 18, preventing the relative rotation between the first shaft 16 and the second shaft 19, and a radially inner position outside the locking cavities 18, allowing the relative rotation between the first shaft 16 and the second shaft 19.

A control bar 22 is inserted in the second tubular shaft 19, which is axially slidable between a locking position and a release position, and having a control surface 23 facing the through openings 20 and shaped so that, when the control bar 22 is in the locking position, the control surface 23 locks the locking members 21 in the radially outer position, and, when the control bar 22 is in the release position, the control surface 23 allows displacing the locking members 21 in the radially inner position.

The control bar 22 is permanently elastically urged in the locking position, for example by a first spring 24 received in the second tubular shaft 19 and abutting with precompression between a shoulder of the control bar 22 and an abutting surface of the second shaft 19. A rear end 25 of the control bar 22 is connected to a Bowden connector 26.

The Bowden connector 26 is slidably supported parallel to the rotational axis R and in turn connected with the end of an inner cable of the Bowden cable 14, the outer sheath of which is constrained to a support structure 27 of the actuator 1. The traction of the Bowden cable 14 moves the control bar 22, opposing the elastic force of the first spring 24, from the locking position to the release position, allowing the relative rotation between the first and the second shafts and, therefore, between the locking brake 9 and the motor shaft 7.

By releasing the Bowden cable, the first spring 24 pushes the control bar 22 towards the locking position and, by rotating the first shaft 16 relative to the second shaft 19 until overlapping the locking cavities 18 with the through openings 20, the locking members 21 can come back to the radially outer position, where they are again locked by the control surface 23 of the control bar 22. In this manner, the first and the second shafts and, thus, the locking brake and the motor shaft are again coupled integrally in rotation.

Generally, with reference to the first decoupler 11 and the second decoupler 12, the terms "to uncouple" and "uncoupling" refer to a "uncoupling of the rotary motion" of the two components between which the decoupler is connected, and not necessarily to a complete separation or moving of the two "uncoupled" components away from one another.

With reference to the first decoupler 11, in the "coupled" condition the first shaft 16 is constrained integrally in rotation to the second shaft 19, whereby the two shafts rotate together and can transmit a torsion. In the "uncoupled" condition, the first shaft 16 can rotate relative to the second shaft 19, whereby the two shafts are not able to transmit a torsion (except for the torsion due to residual frictions).

The second decoupler 12 comprises a first shaft 28 (connected to the second reduction gear 5) having a tubular wall 29 forming an inner cavity and one or more (preferably 5) through openings 30, a second shaft 31 (connected to the output shaft 8 or forming a portion of the output shaft 8) and received into the inner cavity of the tubular wall 29 rotatably about a rotational axis R and forming one or more locking cavities 32 in a position suitable to overlap with the through openings 30.

One or more locking members 33 are received in the through openings 30 of the second shaft 31, for example rolling members, rollers, spheres, etc., displaceable between a radially inner position in engagement with the through opening 30 and with the locking cavity 32, preventing the relative rotation between the first shaft 28 and the second shaft 31, and a radially outer position outside the locking cavities 32, allowing the relative rotation between the first shaft 28 and the second shaft 31.

A driving sleeve 34 is inserted on the tubular wall 29 of the first shaft 28, which is axially slidable between a locking position and a release position and having a control surface 35 facing the through openings 30 and shaped so that, when the driving sleeve 34 is in the locking position, the control surface 35 locks the locking members 33 in the radially inner position, and, when the driving sleeve 34 is in the release position, the control surface 35 allows displacing the locking members 33 in the radially outer position.

The driving sleeve 34 is permanently elastically urged in the locking position, for example by a second spring 36 abutting with precompression between a shoulder of the driving sleeve 34 and an abutting surface of the first shaft 28. A thrust portion 37 is connected with the Bowden connector 26, e.g., by one or more tie-rods 15 extending externally along the reduction gears 4, 5 and the motor 3, and configured (i.e., positioned and shaped) so that:
  in a first stroke length of the Bowden connector 26 necessary to actuate the first decoupler 11 and to uncouple the motor shaft 7 from the locking brake 9, the thrust portion 37 moves relative to the driving sleeve 34 without displacing it, and
  in a successive second stroke length of the Bowden connector 26, the first decoupler 11 remains actuated and the motor shaft 7 remains uncoupled from the locking brake 9 and the thrust portion 37 engages the driving sleeve 34 and displaces it, opposing the elastic resistance of the second spring 36, from the locking position to the release position, uncoupling the reduction gear 4, 5 from the output shaft 8.

By releasing the Bowden cable, the second spring 36 pushes the driving sleeve 34 towards the locking position and, by rotating the first shaft 28 relative to the second shaft 31 until overlapping the locking cavities 32 with the through openings 30, the locking members 33 can come back to the radially inner position, where they are locked again by the control surface 35 of the driving sleeve 34. In this manner, the first and the second shafts and, thus, the reduction gear 4, 5 and the output shaft 8 are coupled again integrally in rotation.

The thrust portion 37 can also be urged permanently elastically in a position thereof disengaged from the driving sleeve 34, for example, by a third spring 52 abutting with precompression between the thrust portion 37 and the support structure 27.

In accordance with a further aspect of the invention (FIGS. 1, 2), a rotating column 38 is rotatably constrained to a frame 42 of the door 2 and one or more orientable arms 39 are connected integrally in rotation to the rotating column 38 to move (open and close) a shutter 40 of the door 2 in response to a rotation of the rotating column 38. The rotary actuator 1 is at least partially inserted within the rotating column 38 and (with the support structure 27 or at least the motor 3 body) constrained integrally in rotation to the frame 42 (preferably to an upper support 51 of the rotating column 38), while the output shaft 8 is connected to transmit the rotary motion thereof to the rotating column 38, for example, by a direct rotation-preventing connection 41 or by a transmission gear (not shown).

In this manner, (the support structure 27 of) the rotary actuator 1 is stationary relative to the frame 39 and the rotating column 38 rotates together with the output shaft 8 of the actuator 1. In this manner, the motor and the reduction gears are constrained to the transport means structure and do not rotate, whereby the electric cables and the Bowden cables are not subjected to torsions during the opening and closure steps of the door.

Advantageously (FIG. 2), the locking brake 9 is arranged externally to the rotating column 38 (and preferably above an upper support 51 thereof) and connected to the motor shaft 7 through a transmission portion extending from the interior of the rotating column 38 to the exterior thereof. Such transmission portion can be formed, for example, by the first shaft 16 of the first decoupler This reduces the length of the enlarged portion 43 of the rotating column 38 that has to contain the actuator 1 (see the length difference in FIGS. 1 and 2). Furthermore, the locking brake 9 outside the rotating column 38 can be arranged in a not co-axial or aligned manner with the rest of the actuator 1, for example, within the so-called cabinets above the doors of the autobus.

Furthermore, by positioning together with the locking brake 9 also the Bowden connector 26 externally to the rotating column 38 (and preferably above an upper support 51 thereof), it is more easily accessible for maintenance interventions and replacement of the Bowden cable 14.

In accordance with an embodiment, also a sensor 44 for detecting a position and/or angular speed of the motor shaft, for example, a potentiometer or a Hall effect sensor, of the absolute or relative type, can be arranged externally to the rotating column 38 (and preferably above an upper support 51 thereof).

By virtue to the stationary arrangement of the rotary actuator 1 within the column, the electric supply cables and the Bowden cable do not move during the rotating column 38 rotation, and are less prone to wearing; furthermore, they can be better secured and hidden.

As it can be seed, for example, in the FIGS. 1 and 2, the rotary actuator 1 is preferably inserted in an upper part of the rotating column 38.

According to an embodiment, the components (motor, reduction gears, output shaft, decoupler) are joined together by the support structure 27 and insertable/withdrawable together into the/from the rotating column 38 on a single side, preferably the upper side thereof. This obviates the need of disassembling the entire rotating column 38 in the case of maintenance or replacement of the actuator 1.

The reduction gears 4, 5 preferably comprise epicycloidal gears, in which the material resistance and the number of the planet wheels of the second reduction gear 5 are larger than the material resistance and of the number of the planet wheels of the first reduction gear 4.

In an embodiment, the nominal torque produced by and transmissible from the output shaft 8 to the rotating column 38 may be 120 Nm, while the maximum torque may be about 250 Nm.

The first reduction gear 4 can be an epicycloidal gear with two reductions stages (first, or initial, stage 45, second stage 46) with a transmission ratio of 1:28, and the second reduction gear 5 can be an epicycloidal gear with two reductions stages (third stage 47, fifth stage 48, or end stage) with a transmission ratio of 1:24. The output shaft of the final reduction stage 48 may be broached (toothed) and directly fitted in the rotating column 38 to apply the rotation with an overall reduction ratio of 1:675 with respect to the motor shaft 7.

An upper arm of the orientable arms 39 driving the movement of the door 2 shutter 40 can be mounted integrally in rotation and translation to the rotating column 38, as shown in FIG. 5 or, alternatively, the orientable arm 39 can be fitted with the rotating column 38 integrally in rotation, but translatable or adjustable in height, for example by an axial guide welded to the rotating column 38 (not shown).

An upper support 51 of the rotating column 38, provided for the connection of the rotating column 38 to the fixed frame 42 of the door 2, may comprise an oscillating joint 50, adjustable transversally to the rotational axis 49 of the rotating column 38 and lockable in the desired adjustment position.

Preferably, the outer sheaths of the at least one, preferably two Bowden cables 14 may be secured to such upper support 51.

It shall be apparent that, to the rotary actuator and the entry/exit device according to the present invention, those of ordinary skill in the art, in order to meet contingent, specific needs, will be able to make further modifications and variations, all of which fall in any case within the protection scope of the invention, as defined by the following claims.

The invention claimed is:

1. A rotary actuator for an entry and exit device, the entry and exit device for use in a public transport vehicle, the rotary actuator comprising an electric motor, a reduction gear arranged on a front side of the motor and connected to a front portion of a shaft of the motor, an output shaft connected to the reduction gear, an automatic locking brake arranged on a rear side of the motor opposite the front side and connected to a rear portion of the motor shaft, further comprising a first decoupler in addition to said locking brake, said decoupler connected between the rear portion of the motor shaft and the locking brake and actuatable to decouple the motor shaft from the locking brake when the locking brake is engaged.

2. The actuator according to claim 1, comprising a second decoupler connected between the reduction gear and the output shaft and actuatable to decouple the output shaft from the reduction gear.

3. The actuator according to claim 2, comprising an unlocking mechanism configured to actuate the first decoupler first and subsequently the second decoupler.

4. The actuator according to claim 3, wherein the unlocking mechanism comprises a Bowden cable connected to the first decoupler and to at least one tie-rod which is, in turn connected to the second decoupler.

5. The actuator according to claim 1, wherein the reduction gear comprises an epicycloidal gear with a plurality of reduction stages, wherein a number and a mechanical strength of the material of planet pinions of a final reduction stage of the reduction stages are larger than a number and a mechanical strength of the material of planet pinions of an initial reduction stage of the reduction stages.

6. The actuator according to claim 1, wherein the rotary actuator comprises a single unit.

7. The actuator according to claim 1, wherein the entry and exit device is a door or a ramp.

8. A rotary actuator for an entry and exit device, the entry and exit device for use in a public transport vehicle, the rotary actuator comprising:
   an electric motor;
   a reduction gear arranged on a front side of the motor and connected to a front portion of a shaft of the motor;
   an output shaft connected to the reduction gear;
   an automatic locking brake arranged on a rear side of the motor opposite the front side and connected to a rear portion of the motor shaft;
   a first decoupler in addition to said locking brake, said decoupler connected between the rear portion of the motor shaft and the locking brake and actuatable to decouple the motor shaft from the locking brake when the locking brake is engaged; and
   a second decoupler connected between the reduction gear and the output shaft and actuatable to decouple the output shaft from the reduction gear; wherein:
   the first decoupler comprises a first shaft connected to the motor shaft and a second shaft connected to the locking brake, and a control bar connected to a Bowden connector and displaceable between a locking position and a release position for a torsional coupling and uncoupling between the first shaft and the second shaft,
   the second decoupler comprises a further first shaft connected to the reduction gear and a further second shaft connected to the output shaft, a driving sleeve axially slidable between a locking position and an unlocking position for a torsional coupling and uncoupling between the further first shaft and the further second shaft, and a thrust portion connected to the Bowden connector and configured so that:
      in a first stroke length of the Bowden connector, the control bar of the first decoupler moves from the locking position to the release position, uncoupling the motor shaft from the locking brake and the thrust portion moves relative to the driving sleeve without displacing the driving sleeve, and
      in a second stroke length of the Bowden connector successive to the first stroke length, the motor shaft continues to be uncoupled from the locking brake while the thrust portion engages and moves the driving sleeve from the locking position to the unlocking position, thus uncoupling the reduction gear from the output shaft.

9. The rotary actuator according to claim 8, comprising an unlocking mechanism configured to actuate the first and second decouplers.

10. The rotary actuator according to claim 9, wherein the unlocking mechanism comprises a Bowden cable connected to the Bowden connector of the first decoupler and to at least one tie-rod which is in turn connected to the second decoupler.

11. The rotary actuator according to claim 8, wherein the reduction gear comprises an epicycloidal gear with a plurality of reduction stages, wherein a number and a mechanical strength of the material of planet pinions of a final reduction stage of the reduction stages are larger than a number and a mechanical strength of the material of planet pinions of an initial reduction stage of the reduction stages.

12. The rotary actuator according to claim 8, wherein the entry and exit device is one of a door and a ramp.

13. A door for a vehicle, comprising:
   a fixed frame, a rotating column rotatably mounted to the fixed frame, at least one arm extending from the rotating column for moving a shutter in response to a rotation of the rotating column, and
   a rotary actuator for the door, the rotating column the rotary actuator comprising an electric motor, a reduction gear arranged on a front side of the motor and connected to a front portion of a shaft of the motor, an output shaft connected to the reduction gear, an automatic locking brake arranged on a rear side of the motor opposite the front side and connected to a rear portion of the motor shaft, further comprising a first decoupler in addition to said locking brake, said decoupler connected between the rear portion of the motor shaft and the locking brake and actuatable to decouple the motor shaft from the locking brake when the locking brake is engaged, said rotary actuator being at least partially inserted within the rotating column and fixed to the frame, the output shaft is connected to the at least one arm for rotating the at least one arm
   wherein:
   the first decoupler comprises a first shaft connected to the motor shaft and a second shaft connected to the locking brake, and a control bar connected to a Bowden connector and displaceable between a locking position and a release position for a torsional coupling and uncoupling between the first shaft and the second shaft, a second decoupler connected between the reduction gear and the output shaft and actuatable to decouple the output shaft from the reduction gear;
   the second decoupler comprises a further first shaft connected to the reduction gear and a further second shaft connected to the output shaft, a driving sleeve axially slidable between a locking position and an unlocking position for a torsional coupling and uncoupling between the further first shaft and the further second shaft, and a thrust portion connected to the Bowden connector and configured so that:
   in a first stroke length of the Bowden connector, the control bar of the first decoupler moves from the locking position to the release position, uncoupling the motor shaft from the locking brake and the thrust portion moves relative to the driving sleeve without displacing the driving sleeve, and
   in a second stroke length of the Bowden connector successive to the first stroke length, the motor shaft continues to be uncoupled from the locking brake while the thrust portion engages and moves the driving sleeve from the locking position to the unlocking position, thus uncoupling the reduction gear from the output shaft.

14. The door according to claim 13, wherein the rotary actuator is configured to be inserted and withdrawn from only one end of the rotating column.

15. The door according to claim 13, wherein the locking brake is positioned outside the rotating column and is connected to the motor shaft via a transmission portion extending from an interior of the rotating column to an exterior of the rotating column.

16. The door according to claim 15, wherein the locking brake is not co-axially aligned with the motor shaft.

17. The door according to claim 15, further comprising a Bowden connector for actuating the decoupler.

18. The door according to claim 15, wherein a sensor for detecting one of a position and an angular speed of the motor shaft is positioned outside the rotating column.

19. The door according to claim 13, wherein the rotary actuator is received in an upper part of the rotating column.

\* \* \* \* \*